US009495933B2

(12) United States Patent
Lin

(10) Patent No.: US 9,495,933 B2
(45) Date of Patent: Nov. 15, 2016

(54) ANALOG DATA TRANSMITTER APPLIED IN LCD APPARATUS AND OPERATING METHOD THEREOF

(71) Applicant: Raydium Semiconductor Corporation, Hsinchu (TW)

(72) Inventor: Po-Cheng Lin, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 244 days.

(21) Appl. No.: 14/517,683

(22) Filed: Oct. 17, 2014

(65) Prior Publication Data

US 2015/0130776 A1 May 14, 2015

(30) Foreign Application Priority Data

Nov. 8, 2013 (TW) ............................ 102140675 A

(51) Int. Cl.

*G06F 3/038* (2013.01)
*G09G 5/00* (2006.01)
*G09G 3/36* (2006.01)

(52) U.S. Cl.

CPC .... *G09G 3/3685* (2013.01); *G09G 2310/0291* (2013.01)

(58) Field of Classification Search

None

See application file for complete search history.

(56) References Cited

U.S. PATENT DOCUMENTS

2009/0140811 A1* 6/2009 Miyamoto ........... G09G 3/3685 330/255

* cited by examiner

*Primary Examiner* — Nicholas Lee

(57) ABSTRACT

An analog data transmitter applied in a LCD apparatus includes an output pad, a channel operational amplifier, an initial switch, an auxiliary switch module, and a detection unit. The detection unit selectively starts a first switch unit or a second switch unit of the auxiliary switch module according to a pulse width modulation corresponding to a data conversion amplitude of an output data signal outputted from the output pad. During a period of the first switch unit or the second switch unit operating from a first time to a second time, transistors in an output stage of the channel operational amplifier operate in a linear region of smaller resistance instead of a saturation region of larger resistance, and the initial switch is turned-off during the period and not started until the second time. The length of the period corresponds to the pulse width modulation.

10 Claims, 5 Drawing Sheets

ANALOG DATA TRANSMITTER APPLIED IN LCD APPARATUS AND OPERATING METHOD THEREOF

BACKGROUND OF THE INVENTION

Field of the Invention

This invention relates to a liquid crystal display, especially to an analog data transmitter applied in the liquid crystal display (LCD) apparatus and operating method thereof.

Description of the Related Art

With the progress of liquid crystal displaying technology, the liquid crystal display has been widely applied in different regions, and the size and pixels of the LCD panel have been increased accordingly.

In order to meet the requirement of the increasing size and pixels of the LCD panel, the transmitting speed of the analog data transmitter used to transmit data should be also increased to avoid poor displaying quality caused by the difference between the data transmitted by different pixels of the LCD panel.

As to conventional high-speed analog data transmitter, the mechanism of directly increasing the current of the operational amplifier in the analog data transmitter or the mechanism of starting a slew-rate enhancement circuit once the voltage exceeds a default threshold voltage is used to increase the speed of the analog data transmitter. However, if the current of the operational amplifier in the analog data transmitter is directly increased, the static power consumption of the entire circuit will be increased; no matter the current of the operational amplifier in the analog data transmitter is directly increased or the slew-rate enhancement circuit is used, they both fail to improve the poor displaying quality of the LCD panel and the poor performance of the analog data transmitter caused by the high-temperature problem generated when the analog data transmitter is operated at high speed.

SUMMARY OF THE INVENTION

Therefore, the invention provides to an analog data transmitter applied in a liquid crystal display and operating method thereof to solve the above-mentioned problems.

An embodiment of the invention is an analog data transmitter. In this embodiment, the analog data transmitter is applied in a liquid crystal display (LCD) apparatus. The analog data transmitter includes an output pad, a channel operational amplifier, an initial switch, an auxiliary switch module, and a detection unit. The output pad is used for outputting an output data signal. The channel operational amplifier includes a first input terminal, a second input terminal, and an output stage, wherein the output stage includes a plurality of transistors and the first input terminal is used to receive an input data signal. The initial switch is coupled to the output stage. The auxiliary switch module is coupled between the initial switch and the output pad. The auxiliary switch module includes a first switch unit and a second switch unit, wherein the first switch unit and the second switch unit are coupled in series between an operating voltage and a ground terminal, the initial switch and the output pad are both coupled between the first switch unit and the second switch unit. The detection unit is coupled to the second input terminal, the output pad, and the auxiliary switch module and used for selectively starting the first switch unit or the second switch unit of the auxiliary switch module according to a pulse width modulation corresponding to a data conversion amplitude of the output data signal outputted from the output pad. During a period from a first time T0 a second time, the first switch unit or the second switch unit is started at the first time and then operated until the second time, the plurality of transistors in the output stage is operate in a linear region of smaller resistance instead of a saturation region of larger resistance, and the initial switch is turned-off during the period and not started until the second time, a time length of the period corresponds to the pulse width modulation.

In an embodiment, when the detection unit detects that the data conversion amplitude of the output data signal rises, the detection unit starts the first switch unit of the auxiliary switch module to couple the initial switch with the operating voltage.

In an embodiment, when the detection unit detects that the data conversion amplitude of the output data signal drops, the detection unit starts the second switch unit of the auxiliary switch module to couple the initial switch with the ground terminal.

In an embodiment, the analog data transmitter includes a resistor for electrostatic protection, one terminal of the resistor being coupled between the first switch unit and the second switch unit, another terminal of the resistor being coupled to the output pad.

In an embodiment, temperature of the analog data transmitter relates to power consumption of the analog data transmitter, when the plurality of transistors in the output stage is operate in a linear region of smaller resistance during the period, the power consumption of the analog data transmitter is decreased and the temperature of the analog data transmitter is also decreased.

In an embodiment, the LCD apparatus includes a source driver, and the analog data transmitter is applied in the source driver.

Another embodiment of the invention is an analog data transmitter operating method. In this embodiment, the analog data transmitter operating method is used for operating an analog data transmitter. The analog data transmitter includes an output pad, a channel operational amplifier, an initial switch, an auxiliary switch module, and a detection unit. The channel operational amplifier includes a first input terminal, a second input terminal, and an output stage. The output stage includes a plurality of transistors; the auxiliary switch module includes a first switch unit and a second switch unit. The initial switch is coupled to the output stage; the first switch unit and the second switch unit are coupled in series between an operating voltage and a ground terminal. The initial switch and the output pad are both coupled between the first switch unit and the second switch unit. The detection unit is coupled to the second input terminal, the output pad, and the auxiliary switch module. The analog data transmitter operating method includes steps of: (a) the first input terminal receiving an input data signal; (b) the detection unit detecting an output data signal outputted by the output pad and selectively starting the first switch unit or the second switch unit of the auxiliary switch module according to a pulse width modulation corresponding to a data conversion amplitude of the output data signal; and (c) during a period from a first time T0 a second time, starting the first switch unit or the second switch unit at the first time and then operating the first switch unit or the second switch unit until the second time, wherein the plurality of transistors in the output stage is operate in a linear region of smaller resistance instead of a saturation region of larger resistance, and the initial switch is turned-off during the period and not started until the second time, a time length of the period corresponds to the pulse width modulation.

Compared to the prior art, the analog data transmitter applied in the liquid crystal display and operating method thereof can provide different pulse width modulation methods corresponding different data conversion amplitudes to decrease the temperature and the power consumption when the analog data transmitter transmits data; therefore, not only the slew rate of the analog data transmitter can be increased to meet the high-speed data transmission requirement of the large-size high-resolution LCD apparatus, but also the over-heat problem of the conventional analog data transmitter can be effectively improved to enhance the performance of the analog data transmitter and improve the displaying quality of the LCD apparatus.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A preferred embodiment of the invention is an analog data transmitter. In this embodiment, the analog data transmitter is applied in a source driver of a LCD apparatus, but not limited to this.

Figure 1:
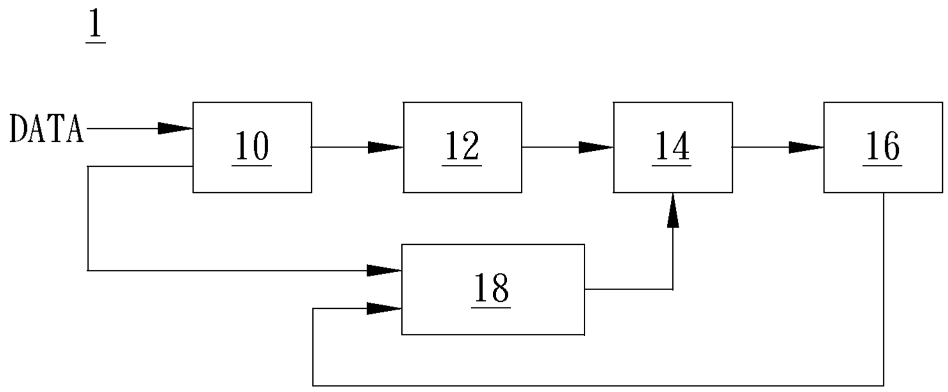
FIG. 1 illustrates a functional block diagram of the analog data transmitter in an embodiment of the invention.

Please refer to FIG. 1. FIG. 1 illustrates a functional block diagram of the analog data transmitter in an embodiment of the invention. As shown in FIG. 1, the analog data transmitter 1 includes a channel operational amplifier 10, an initial switch 12, an auxiliary switch module 14, an output pad 16, and a detection unit 18. Wherein, the channel operational amplifier 10 is coupled to the initial switch 12; the initial switch 12 is coupled to the auxiliary switch module 14; the auxiliary switch module 14 is coupled to the output pad 16; the detection unit 18 is coupled to the channel operational amplifier 10, the auxiliary switch module 14, and the output pad 16. The channel operational amplifier 10 receives an input data signal DATA.

Figure 2:
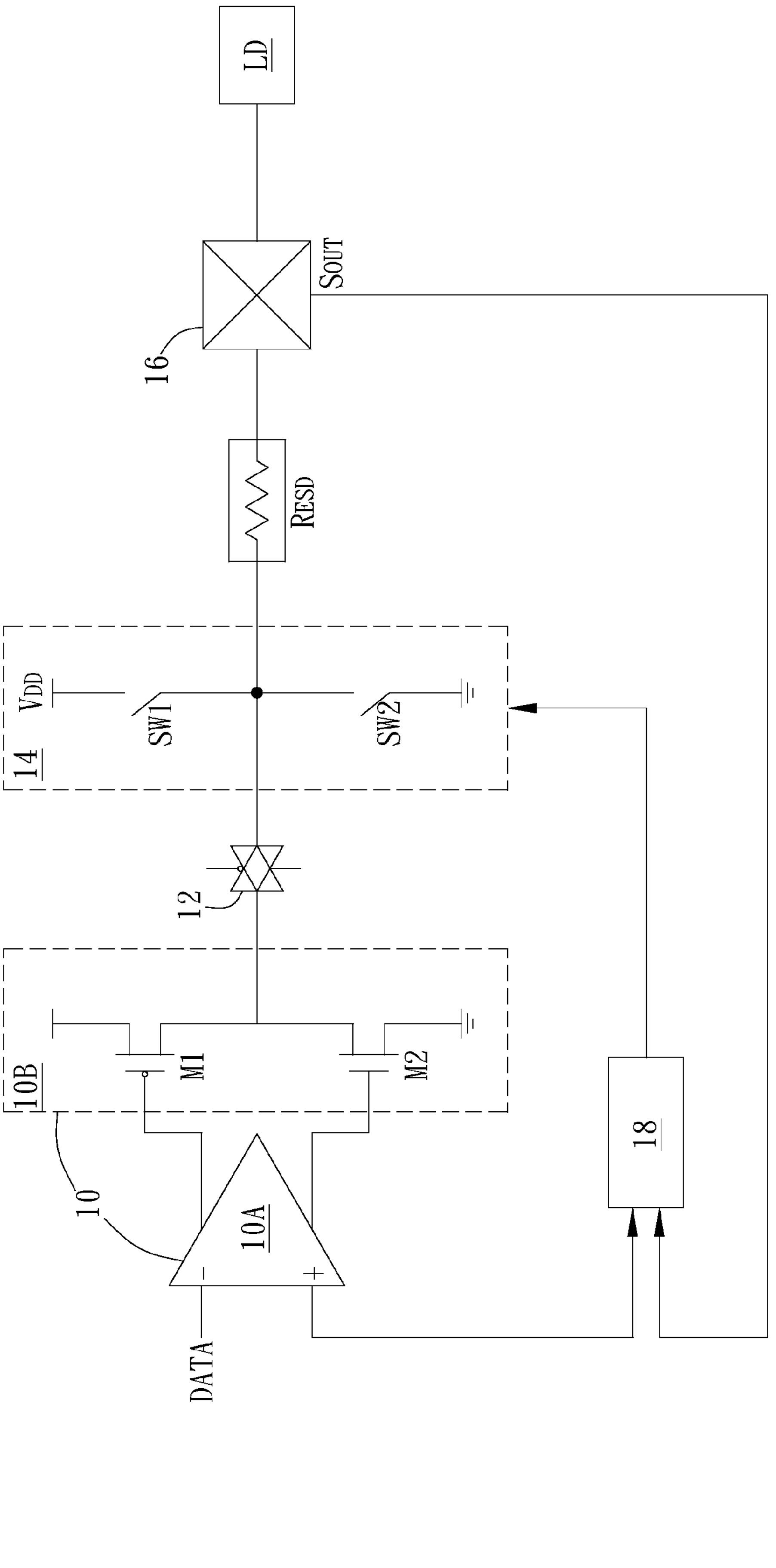
FIG. 2 illustrates a detailed schematic diagram of the analog data transmitter in FIG. 1.

Please refer to FIG. 2. FIG. 2 illustrates a detailed schematic diagram of the analog data transmitter 1 in FIG. 1. As shown in FIG. 2, the analog data transmitter 1 includes the channel operational amplifier 10, the initial switch 12, the auxiliary switch module 14, a resistor $R_{ESD}$, the output pad 16, the detection unit 18, and an output load LD. Wherein, the resistor $R_{ESD}$ is coupled between the auxiliary switch module 14 and the output pad 16.

In this embodiment, the channel operational amplifier 10 includes an operational amplifier 10A and an output stage 10B. The operational amplifier 10A includes a first input terminal − and a second input terminal +. The output stage 10B includes a first transistor M1 and a second transistor M2 coupled in series. Wherein, the first transistor M1 is a P-type metal-oxide-semiconductor field-effect transistor (PMOS) and the second transistor M2 is an N-type metal-oxide-semiconductor field-effect transistor (NMOS), but not limited to this. The auxiliary switch module 14 includes a first switch SW1 and a second switch SW2. The first switch SW1 and the second switch SW2 are coupled in series between the operating voltage $V_{DD}$ and the ground terminal. An input terminal of the initial switch 12 is coupled between the first transistor M1 and the second transistor M2. An output terminal of the initial switch 12 is coupled between the first switch unit SW1 and the second switch unit SW2.

The detection unit 18 is coupled to the second input terminal +of the operational amplifier 10A, the output pad 16, and the first switch unit SW1 and the second switch unit SW2 of the auxiliary switch module 14. The detection unit 18 detects an output data signal $S_{OUT}$ outputted by the output pad 16 and selectively starts the first switch unit SW1 or the second switch unit SW2 of the auxiliary switch module 14 according to a pulse width modulation corresponding to a data conversion amplitude of the output data signal $S_{OUT}$.

In practical applications, when the detection unit 18 detects that the data conversion amplitude of the output data signal $S_{OUT}$ rises, the detection unit 18 will start the first switch unit SW1 of the auxiliary switch module 14 to couple the initial switch 12 with the operating voltage $V_{DD}$. When the detection unit 18 detects that the data conversion amplitude of the output data signal $S_{OUT}$ drops, the detection unit 18 starts the second switch unit SW2 of the auxiliary switch module 14 to couple the initial switch 12 with the ground terminal.

Figure 3:
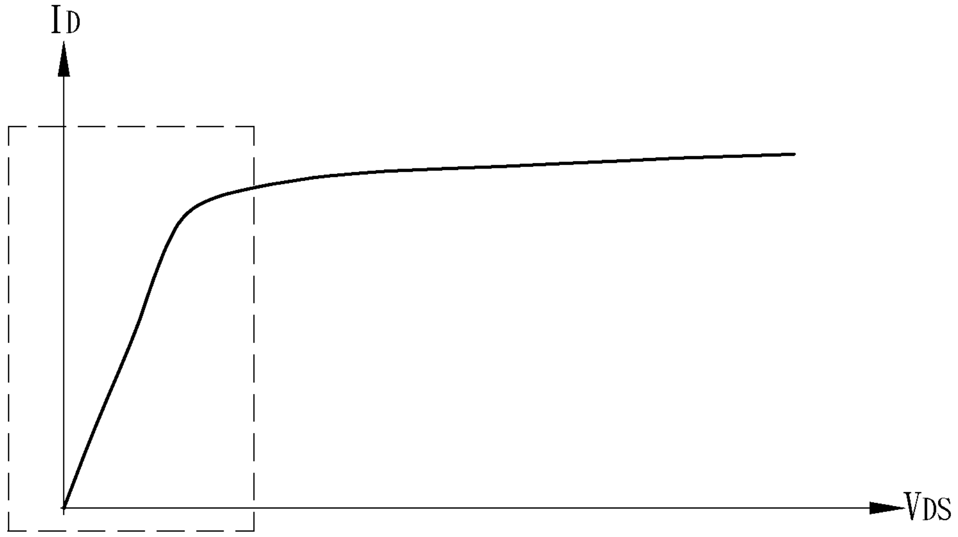
FIG. 3 illustrates a schematic diagram of the transistors in the output stage being operated in the linear region of smaller resistance instead of the saturation region of larger resistance when the auxiliary switch module is started.

Please refer to FIG. 3. FIG. 3 illustrates an $I_D$ (drain current)-$V_{DS}$ (drain-source voltage) curve of the transistor of the output stage. As shown in FIG. 3, when the auxiliary switch module 14 is started, since the initial switch 12 will be delayed to be started, the first transistor M1 and the second transistor M2 of the output stage 10B are operated in the linear region of the $I_D$-$V_{DS}$ curve instead of the saturation region of the $I_D$-$V_{DS}$ curve. Because the slope of the $I_D$-$V_{DS}$ curve is inversely proportional to the resistance, and the slope of the linear region of the $I_D$-$V_{DS}$ curve is larger than that of the saturation region of the $I_D$-$V_{DS}$ curve, the first transistor M1 and the second transistor M2 of the output stage 10B operated in the linear region of the $I_D$-$V_{DS}$ curve will have smaller resistance than being operated in the saturation region of the $I_D$-$V_{DS}$ curve. Therefore, the consumed power proportional to the resistance can be reduced when the first transistor M1 and the second transistor M2 of the output stage 10B operated in the linear region of the $I_D$-$V_{DS}$ curve, and the temperature of the analog data transmitter 1 can be also effectively reduced.

Then, please refer to FIG. 4A, FIG. 4B, FIG. 40, and FIG. 4D. FIG. 4A, FIG. 4B, FIG. 40, and FIG. 4D illustrate timing diagrams of the output data signal $S_{OUT}$, the initial switch signal $S_{INI}$, the auxiliary switch signal $S_H$, and the pulse-width modulated switch signal $S_{INI}$-$S_H$ respectively.

Figures 4A, 4B, 4C, 4D:
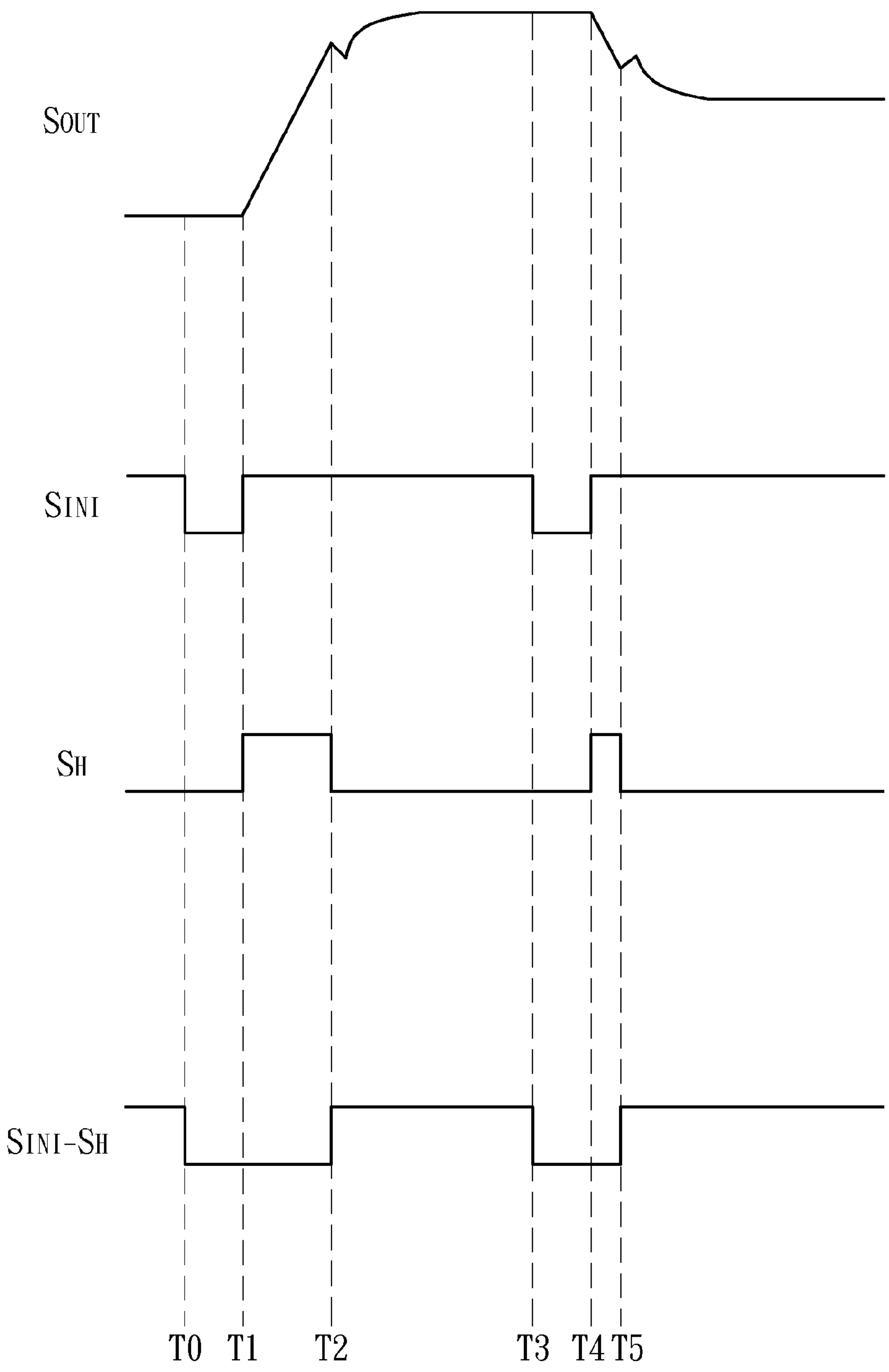
FIG. 4A, FIG. 4B, FIG. 4C, and FIG. 4D illustrate timing diagrams of the output data signal, the initial switch signal, the auxiliary switch signal, and the pulse-width modulated switch signal respectively.

As shown in FIG. 4B, at an initial time T0, the level of the initial switch signal $S_{INI}$ is changed from high level to low level and then maintained low level until a first time T1. At the first time T1, the level of the initial switch signal $S_{INI}$ is changed from low level to high level and then maintained high level until a third time T3. At the third time T3, the level of the initial switch signal $S_{INI}$ is changed from high level to low level and then maintained low level until a fourth time T4. At the fourth time T4, the level of the initial switch signal $S_{INI}$ is changed from low level to high level and then maintained high level. This means that at the initial time T0, the initial switch 12 is switched from ON state to OFF sate and then maintained OFF state until the first time T1. At the first time T1, the initial switch 12 is switched from OFF sate to ON state and then maintained ON state until the third time T3. At the third time T3, the initial switch 12 is switched from ON state to OFF sate and then maintained OFF state until the fourth time T4. At the fourth time T4, the initial switch 12 is switched from OFF sate to ON state and then maintained ON state. That is to say, the OFF sate of the initial switch 12 is only maintained from the initial time T0 to the first time T1 and from the third time T3 to the fourth time T4.

As shown in FIG. 4A, FIG. 40, and FIG. 4D, when the output data signal $S_{OUT}$ starts to rise from the first time T1 to the second time T2, the auxiliary switch signal $S_H$ is switched to high level at the first time T1 and maintained high level until the second time T2; that is to say, the first switch unit SW1 of the auxiliary switch module 14 will be switched to ON state at the first time T1 and then maintained ON state until the second time T2. Since the initial switch 12 will be OFF state while the auxiliary switch module 14 is ON state, the OFF state of the initial switch 12 will be OFF state from the initial time T0 to the second time T2, and then switched to ON state at the second time T2 instead of being switched to ON state at the first time T1. Therefore, the pulse-width modulated switch signal $S_{INI}$-$S_H$ will be changed from high level to low level at the initial time T0 and then maintained low level until the second time T2; the time that the pulse-width modulated switch signal $S_{INI}$-$S_H$ is switched from low level to high level will be delayed from the original first time T1 to the second time T2.

During the period from the first time T1 to the second time T2, the first switch unit SW1 of the auxiliary switch module 14 is started at the first time T1 and operated until the second time T2, the first transistor M1 and the second transistor M2 of the output stage 10B are operated in the linear region of the $I_D$-$V_{DS}$ curve instead of being operated in the saturation region of the $I_D$-$V_{DS}$ curve, and the initial switch 12 is OFF state from the first time T1 to the second time T2, and then switched to ON state at the second time T2. The time length (T2−T1) of the period from the first time T1 to the second time T2 corresponds to the time consumed by the data conversion amplitude of the output data signal $S_{OUT}$ (namely the rising portion of the output data signal $S_{OUT}$). In addition, the time length (T2−T1) of the period from the first time T1 to the second time T2 also corresponds to the pulse width modulation when the initial switch signal $S_{INI}$ is changed to the pulse-width modulated switch signal $S_{INI}$-$S_H$.

When the output data signal $S_{OUT}$ starts to fall from the fourth time T4 to the fifth time T5, the auxiliary switch signal $S_H$ is switched to high level at the fourth time T4 and maintained high level until the fifth time T5; that is to say, the second switch unit SW2 of the auxiliary switch module 14 will be switched to ON state at the fourth time T4 and then maintained ON state until the fifth time T5. Since the initial switch 12 will be OFF state while the auxiliary switch module 14 is ON state, the OFF state of the initial switch 12 will be OFF state from the third time T3 to the fifth time T5, and then switched to ON state at the fifth time T5 instead of being switched to ON state at the fourth time T4. Therefore, the pulse-width modulated switch signal $S_{INI}$-$S_H$ will be changed from high level to low level at the third time T3 and then maintained low level until the fifth time T5; the time that the pulse-width modulated switch signal $S_{INI}$-$S_H$ is switched from low level to high level will be delayed from the original fourth time T4 to the fifth time T5.

During the period from the fourth time T4 to the fifth time T5, the second switch unit SW2 of the auxiliary switch module 14 is started at the fourth time T4 and operated until the fifth time T5, the first transistor M1 and the second transistor M2 of the output stage 10B are operated in the linear region of the $I_D$-$V_{DS}$ curve instead of being operated in the saturation region of the $I_D$-$V_{DS}$ curve, and the initial switch 12 is OFF state from the fourth time T4 to the fifth time T5, and then switched to ON state at the fifth time T5. The time length (T5−T4) of the period from the fourth time T4 to the fifth time T5 corresponds to the time consumed by the data conversion amplitude of the output data signal $S_{OUT}$ (namely the falling portion of the output data signal $S_{out}$). In addition, the time length (T5−T4) of the period from the fourth time T4 to the fifth time T5 also corresponds to the pulse width modulation when the initial switch signal $S_{INI}$ is changed to the pulse-width modulated switch signal $S_{INI}$-$S_H$.

By doing so, since the initial switch 12 will be delayed to be started, the first transistor M1 and the second transistor M2 of the output stage 10B are operated in the linear region of the $I_D$-$V_{DS}$ curve instead of the saturation region of the $I_D$-$V_{DS}$ curve. Because the slope of the $I_D$-$V_{DS}$ curve is inversely proportional to the resistance, and the slope of the linear region of the $I_D$-$V_{DS}$ curve is larger than that of the saturation region of the $I_D$-$V_{DS}$ curve, the first transistor M1 and the second transistor M2 of the output stage 10B operated in the linear region of the $I_D$-$V_{DS}$ curve will have smaller resistance than being operated in the saturation region of the $I_D$-$V_{DS}$ curve. Therefore, the consumed power proportional to the resistance can be reduced when the first transistor M1 and the second transistor M2 of the output stage 10B operated in the linear region of the $I_D$-$V_{DS}$ curve, and the temperature of the analog data transmitter 1 can be also effectively reduced.

Another embodiment of the invention is an analog data transmitter operating method. In this embodiment, the analog data transmitter operating method is used for operating an analog data transmitter. The analog data transmitter can be applied in a source driver of a LCD apparatus, but not limited to this. The analog data transmitter includes an output pad, a channel operational amplifier, an initial switch, an auxiliary switch module, and a detection unit. The channel operational amplifier includes a first input terminal, a second input terminal, and an output stage. The output stage includes a plurality of transistors; the auxiliary switch module includes a first switch unit and a second switch unit. The initial switch is coupled to the output stage; the first switch unit and the second switch unit are coupled in series between an operating voltage and a ground terminal. The initial switch and the output pad are both coupled between the first switch unit and the second switch unit. The detection unit is coupled to the second input terminal, the output pad, and the auxiliary switch module.

Figure 5:
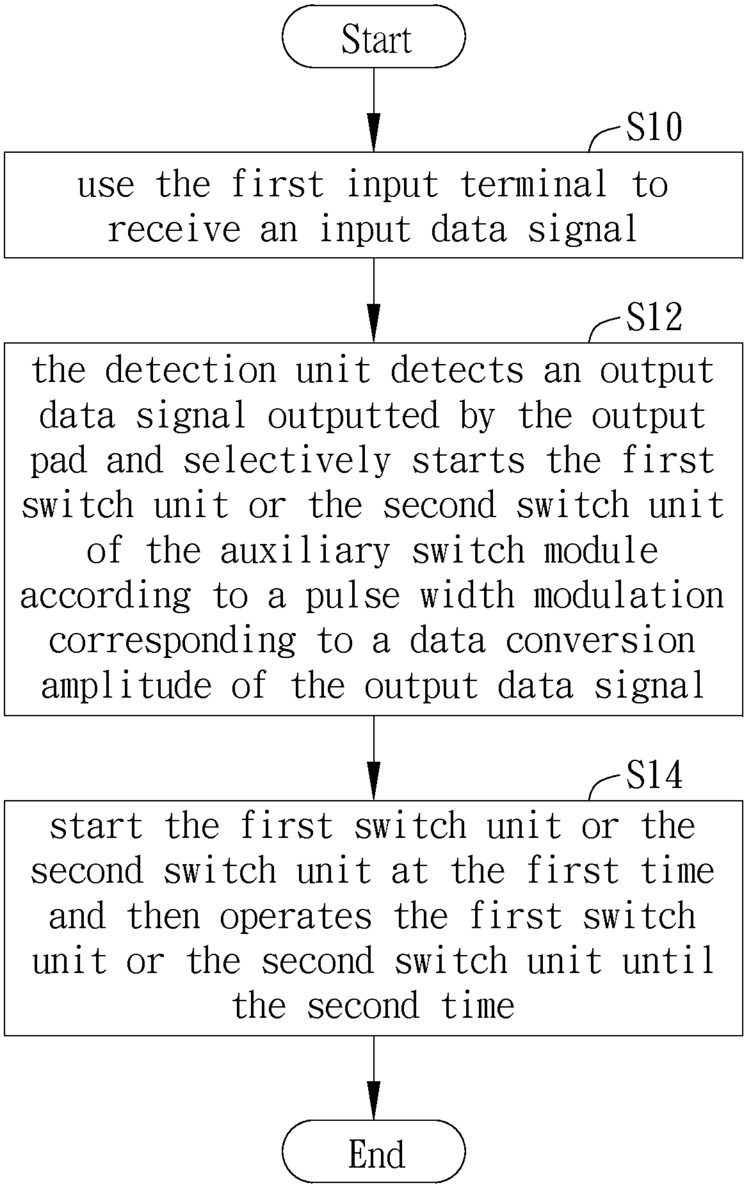
FIG. 5 illustrates a flowchart of the analog data transmitter operating method in another embodiment of the invention.

Please refer to FIG. 5. FIG. 5 illustrates a flowchart of the analog data transmitter operating method in this embodiment. As shown in FIG. 5, in the step S10, the analog data transmitter uses the first input terminal to receive an input data signal. In the step S12, the detection unit detects an output data signal outputted by the output pad and selectively starts the first switch unit or the second switch unit of the auxiliary switch module according to a pulse width modulation corresponding to a data conversion amplitude of the output data signal. In the step S14, during a period from a first time T0 a second time, the method starts the first switch unit or the second switch unit at the first time and then operates the first switch unit or the second switch unit until the second time, wherein the plurality of transistors in the output stage is operate in a linear region of smaller resistance instead of a saturation region of larger resistance, and the initial switch is turned-off during the period and not started until the second time, a time length of the period corresponds to the pulse width modulation.

Compared to the prior art, the analog data transmitter applied in the liquid crystal display and operating method thereof can provide different pulse width modulation methods corresponding different data conversion amplitudes to decrease the temperature and the power consumption when the analog data transmitter transmits data; therefore, not only the slew rate of the analog data transmitter can be increased to meet the high-speed data transmission requirement of the large-size high-resolution LCD apparatus, but also the over-heat problem of the conventional analog data transmitter can be effectively improved to enhance the performance of the analog data transmitter and improve the displaying quality of the LCD apparatus.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An analog data transmitter, applied in a liquid crystal display (LCD) apparatus, the analog data transmitter comprising:

an output pad, for outputting an output data signal;

a channel operational amplifier, comprising a first input terminal, a second input terminal, and an output stage, wherein the output stage comprises a plurality of transistors and the first input terminal is used to receive an input data signal;

an initial switch, coupled to the output stage;

an auxiliary switch module, coupled between the initial switch and the output pad, the auxiliary switch module comprising a first switch unit and a second switch unit, wherein the first switch unit and the second switch unit are coupled in series between an operating voltage and a ground terminal, the initial switch and the output pad are both coupled between the first switch unit and the second switch unit; and a detection unit, coupled to the second input terminal, the output pad, and the auxiliary switch module, for selectively starting the first switch unit or the second switch unit of the auxiliary switch module according to a pulse width modulation corresponding to a data conversion amplitude of the output data signal outputted from the output pad;

wherein during a period from a first time T0 a second time, the first switch unit or the second switch unit is started at the first time and then operated until the second time, the plurality of transistors in the output stage is operate in a linear region of smaller resistance instead of a saturation region of larger resistance, and the initial switch is turned-off during the period and not started until the second time, a time length of the period corresponds to the pulse width modulation.

2. The analog data transmitter of claim 1, wherein when the detection unit detects that the data conversion amplitude of the output data signal rises, the detection unit starts the first switch unit of the auxiliary switch module to couple the initial switch with the operating voltage.

3. The analog data transmitter of claim 1, wherein when the detection unit detects that the data conversion amplitude of the output data signal drops, the detection unit starts the second switch unit of the auxiliary switch module to couple the initial switch with the ground terminal.

4. The analog data transmitter of claim 1, further comprising:

a resistor for electrostatic protection, one terminal of the resistor being coupled between the first switch unit and the second switch unit, another terminal of the resistor being coupled to the output pad.

5. The analog data transmitter of claim 1, wherein temperature of the analog data transmitter relates to power consumption of the analog data transmitter, when the plurality of transistors in the output stage is operate in a linear region of smaller resistance during the period, the power consumption of the analog data transmitter is decreased and the temperature of the analog data transmitter is also decreased.

6. The analog data transmitter of claim 1, wherein the LCD apparatus comprises a source driver, and the analog data transmitter is applied in the source driver.

7. An analog data transmitter operating method, for operating an analog data transmitter, the analog data transmitter comprising an output pad, a channel operational amplifier, an initial switch, an auxiliary switch module, and a detection unit, the channel operational amplifier comprising a first input terminal, a second input terminal, and an output stage, the output stage comprising a plurality of transistors, the auxiliary switch module comprising a first switch unit and a second switch unit, the initial switch being coupled to the output stage, the first switch unit and the second switch unit being coupled in series between an operating voltage and a ground terminal, the initial switch and the output pad being both coupled between the first switch unit and the second switch unit, the detection unit being coupled to the second input terminal, the output pad, and the auxiliary switch module, the analog data transmitter operating method comprising steps of:

(a) the first input terminal receiving an input data signal;

(b) the detection unit detecting an output data signal outputted by the output pad and selectively starting the first switch unit or the second switch unit of the auxiliary switch module according to a pulse width modulation corresponding to a data conversion amplitude of the output data signal; and (c) during a period from a first time T0 a second time, starting the first switch unit or the second switch unit at the first time and then operating the first switch unit or the second switch unit until the second time, wherein the plurality of transistors in the output stage is operate in a linear region of smaller resistance instead of a saturation region of larger resistance, and the initial switch is turned-off during the period and not started until the second time, a time length of the period corresponds to the pulse width modulation.

8. The analog data transmitter operating method of claim 7, wherein when the detection unit detects that the data conversion amplitude of the output data signal rises, the detection unit starts the first switch unit of the auxiliary switch module to couple the initial switch with the operating voltage.

9. The analog data transmitter operating method of claim 7, wherein when the detection unit detects that the data conversion amplitude of the output data signal drops, the detection unit starts the second switch unit of the auxiliary switch module to couple the initial switch with the ground terminal.

10. The analog data transmitter operating method of claim 7, wherein temperature of the analog data transmitter relates to power consumption of the analog data transmitter, when the plurality of transistors in the output stage is operate in a linear region of smaller resistance during the period, the power consumption of the analog data transmitter is decreased and the temperature of the analog data transmitter is also decreased.

* * * * *